(12) United States Patent
Stuart et al.

(10) Patent No.: US 9,016,040 B2
(45) Date of Patent: Apr. 28, 2015

(54) THRUST REVERSER SYSTEM WITH TRANSLATING-ROTATING CASCADE AND METHOD OF OPERATION

(71) Applicant: General Electric Company, Schenectady, NY (US)

(72) Inventors: Alan Roy Stuart, Cincinnati, OH (US); James Michael Cosgrove, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 13/690,065

(22) Filed: Nov. 30, 2012

(65) Prior Publication Data
US 2014/0150403 A1 Jun. 5, 2014

(51) Int. Cl.
*F02K 1/72* (2006.01)
*F02K 1/70* (2006.01)
*F02K 1/64* (2006.01)

(52) U.S. Cl.
CPC ... *F02K 1/72* (2013.01); *F02K 1/70* (2013.01); *F02K 1/64* (2013.01); *Y02T 50/672* (2013.01)

(58) Field of Classification Search
CPC .............. F02K 1/64; F02K 1/70; F02K 1/72; F02K 1/002; F02K 1/004; F02K 1/008; F02K 3/025
USPC ........................................................ 60/226.2
See application file for complete search history.

(56) References Cited

U.S. PATENT DOCUMENTS

| | | | |
|---|---|---|---|
| 3,248,878 A | * | 5/1966 | Clark et al. ................... 60/229 |
| 3,699,682 A | * | 10/1972 | Kleckner ..................... 60/226.2 |
| 3,981,451 A | | 9/1976 | Prior et al. |
| 4,073,440 A | | 2/1978 | Hapke |
| 4,865,256 A | | 9/1989 | Durand et al. |
| 5,209,057 A | | 5/1993 | Remlaoui |
| 5,706,649 A | * | 1/1998 | Robinson et al. ............ 60/226.2 |
| 5,722,231 A | | 3/1998 | Porte |

(Continued)

FOREIGN PATENT DOCUMENTS

| | | |
|---|---|---|
| FR | 1482538 | 5/1967 |
| GB | 2203494 | 10/1988 |
| WO | 2012/097995 | 7/2012 |

(Continued)

OTHER PUBLICATIONS

PCT Search Report and Written Opinion issued in connection with corresponding Application No. PCT/US2013070566 on Sep. 24, 2014.

*Primary Examiner* — Phutthiwat Wongwian
*Assistant Examiner* — Thomas Burke
(74) *Attorney, Agent, or Firm* — General Electric Company; Pamela A. Kachur (57) ABSTRACT

A thrust reverser system and operation suitable for high-bypass turbofan engines. The thrust reverser system includes a cascade system adapted to be translated with a translating cowl in an aft direction of an engine to expose a circumferential opening. The cascade system is deployed from a stowed position as the translating cowl and the cascade system are translated in the aft direction. During deployment of the cascade system, a fore end thereof translates in the aft direction and an aft end thereof initially translates in the aft direction and then subsequently rotates about the fore end so that further translation of the cascade segment in the aft direction causes the cascade segment to move to a deployed position and divert bypass air within a bypass duct of the engine through the circumferential opening.

23 Claims, 11 Drawing Sheets

(56) References Cited

U.S. PATENT DOCUMENTS 5,974,783 A      11/1999   Gonidec et al.
5,983,625 A * 11/1999   Gonidec et al. .............. 60/226.2
6,082,096 A *   7/2000   Vauchel ....................... 60/226.2

2013/0025259 A1 * 1/2013 Beardsley et al. ........... 60/226.2

FOREIGN PATENT DOCUMENTS

WO      2012/097996      7/2012

* cited by examiner

THRUST REVERSER SYSTEM WITH TRANSLATING-ROTATING CASCADE AND METHOD OF OPERATION

BACKGROUND OF THE INVENTION

The present invention relates to high-bypass gas turbine engines, and more particularly to thrust reverser systems utilized in high-bypass turbofan engines to provide thrust reversal by diverting air from a fan bypass duct.

Figure 1:
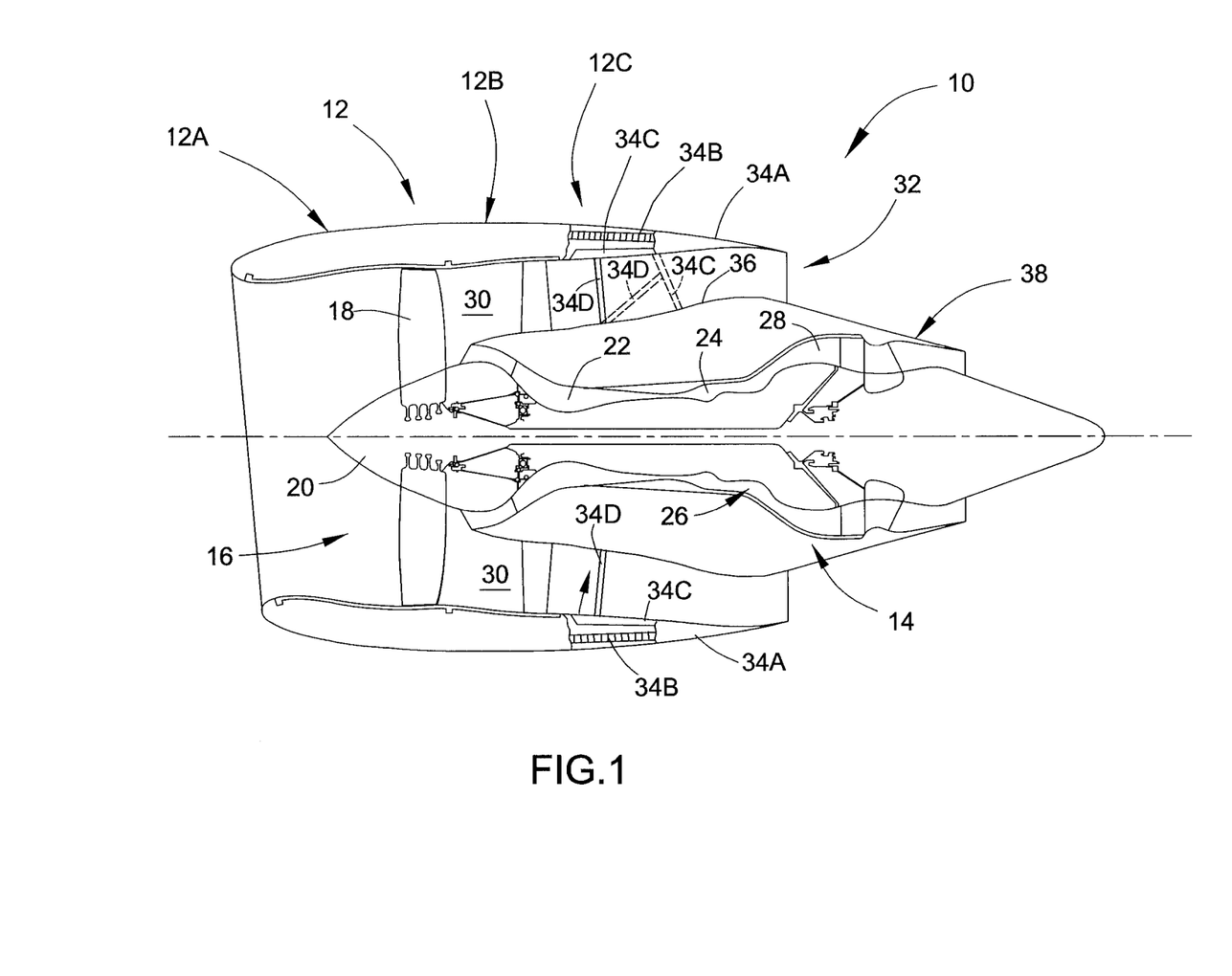
FIG. 1 schematically represents a cross-sectional view of a high-bypass turbofan engine.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a spinner nose 20 projecting forwardly from an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36 that surrounds the core engine 14, and exits the duct 30 through a fan exit nozzle 32. The nacelle 12 defines the radially outward boundary of the bypass duct 30, and the core cowl 36 defines the radially inward boundary of the bypass duct 30 as well as provides an aft core cowl transition surface to a primary exhaust nozzle 38 that extends aftward from the core engine 14.

The nacelle 12 is typically composed of three primary elements that define the external boundaries of the nacelle 12: an inlet assembly 12A, a fan cowl 12B interfacing with an engine fan case that surrounds the fan blades 18, and a thrust reverser system 12C located aft of the fan cowl 12B. The thrust reverser system 12C comprises three primary components: a translating cowl (transcowl) 34A mounted to the nacelle 12, a cascade 34B mounted within the nacelle 12, and blocker doors 34C shown in a stowed position radially inward from the cascade 34B. The blocker doors 34C are adapted to be pivotally deployed from their stowed position to a deployed position, in which the aft end of each blocker door 34C is pivoted into engagement with the core cowl 36 as represented in phantom in the upper half of FIG. 1. In this sense, the core cowl 36 can also be considered as a component of the thrust reverser system 12C. The cascade 34B is a fixed structure of the nacelle 12, whereas the transcowl 34A is adapted to be translated aft to expose the cascade 34B and deploy the blocker doors 34C into the duct 30 using a link arm 34D, causing bypassed air within the duct 30 to be diverted through the exposed cascade 34B and thereby provide a thrust reversal effect. While two blocker doors 34C are shown in FIG. 1, a plurality of blocker doors 34C are typically circumferentially spaced around the circumference of the nacelle 12.

In a conventional thrust reverser design used in the high bypass turbofan engine 10, the cascade 34B is covered by the stowed blocker doors 34C when the thrust reverser system 12C is not in use, that is, during normal in-flight operation of the engine 10. A drawback of this type of conventional construction is that the transcowl 34A must have a sufficient length and thickness to accommodate the stationary cascades 34B, which results in compromises to the overall diameter of the nacelle 12 or the fan duct area, leading to higher Mach numbers and fan duct losses. In addition, because the blocker doors 34C define portions of the fan duct outer flow surfaces, surface interruptions (gaps and steps) and duct leakage resulting from the doors 34C can increase aerodynamic drag and reduce aerodynamic performance. In addition, the blocker doors 34C incorporate only limited areas of acoustic treatment as well as create discontinuities in the translating cowl acoustic treatment, and are exposed to damage and wear-inducing conditions during normal engine operation. These aspects of conventional thrust reversers can significantly reduce engine performance, engine noise attenuation, specific fuel consumption, and operational reliability.

BRIEF DESCRIPTION OF THE INVENTION

The present invention provides a thrust reverser system and operation thereof that are suitable for high-bypass turbofan engines of types used in aircraft. The thrust reverser system is particularly adapted for use in a gas turbine engine having a core engine, a core cowl surrounding the core engine, a nacelle surrounding the core cowl and comprising a fan cowl, and a bypass duct defined by and between the nacelle and the core cowl.

According to a first aspect of the invention, the thrust reverser system includes a translating cowl mounted to a nacelle and adapted to translate in an aft direction of a gas turbine engine away from a fan cowl to define a circumferential opening therebetween. The translating cowl has a radially inner wall that defines a radially outer flow surface of the bypass duct. The system further includes a fixed structure within the nacelle that does not translate when the translating cowl is translated in the aft direction, and a cascade system mounted to the nacelle and adapted to move between a stowed position and a deployed position. The cascade system has a fore end and an oppositely-disposed aft end, and the cascade system translates in the aft direction of the gas turbine engine and away from the fan cowl as the cascade system moves from the stowed position to the deployed position thereof. The aft end of the cascade system projects into the bypass duct and the cascade system is operable to divert bypass air within the bypass duct through the circumferential opening when the cascade system is in the deployed positions thereof. The fore end of the cascade system is adapted for translating the cascade system in the aft direction, and the aft end of the cascade system is adapted for initially causing the aft end to translate in the aft direction as the fore end translates in the aft direction and then subsequently rotate about the fore end so that further translation of the cascade segment in the aft direction causes the cascade segment to move to the deployed position thereof.

According to a second aspect of the invention, a method of operating a thrust reverser system installed on a high-bypass turbofan engine entails stowing a cascade system in a stowed position so that an inner wall of a translating cowl is between the bypass duct and the cascade system, and then translating the translating cowl and the cascade system in an aft direction of the gas turbine engine to expose a circumferential opening. The cascade system is deployed from the stowed positions thereof to a deployed position thereof as the translating cowl and the cascade system are translated in the aft direction. The cascade system has a fore end and an oppositely-disposed second end, and the cascade system is deployed as a result of the fore end translating in the aft direction and the aft end initially translating in the aft direction as the fore end translates in the aft direction and then subsequently rotating about the fore end so that further translation of the cascade segment in the aft direction causes the cascade segment to move to the deployed position thereof.

Other aspects of the invention include high-bypass gas turbofan engines equipped with a thrust reverser system having the elements and/or operation described above.

A technical effect of the invention is the ability to completely eliminate the requirement for blocker doors in a thrust reverser system. As such, the invention is also capable of significantly reducing aerodynamic drag and other flow perturbations that would be otherwise attributed to the presence of blocker doors and would reduce aerodynamic and/or acoustic efficiency. Notably, the elimination of blocker doors also facilitates the ability to acoustically treat essentially all of the flow surfaces that define the fan duct outer flow path in the critical area immediately aft of the engine fan. The thrust reverser system achieves these results while also being capable of reducing the overall diameter of the nacelle and/or fan duct area, as well as the weight associated with the thrust reverser system and its components.

Other aspects and advantages of this invention will be better appreciated from the following detailed description.

DETAILED DESCRIPTION OF THE INVENTION

FIGS. 2 through 5 represent views of high-bypass gas turbine (turbofan) engines that include a thrust reverser system 40 in accordance with an embodiment of the invention. As a matter of convenience, the same reference numbers used to identify the engine 10 and certain components in FIG. 1 will be used throughout the following description, including FIGS. 2 through 5, to identify the same or functionally equivalent components of the engines represented in FIGS. 2 through 5. As such, it should be understood that FIGS. 2 through 5 depict the thrust reverser system 40 located within the nacelle 12 of an engine 10 and aft of its fan cowl 12B. It should be further understood that a core cowl 36 defines the radially inward boundary of a bypass duct 30, the nacelle 12 defines the radially outward boundary of the bypass duct 30, and bypassed air of the engine 10 passes through the bypass duct 30 and exits through a fan exit nozzle 32. Other structural and functional aspects of the engine 10 can be understood from the preceding discussion of FIG. 1, and therefore will not be repeated here.

Figure 2:
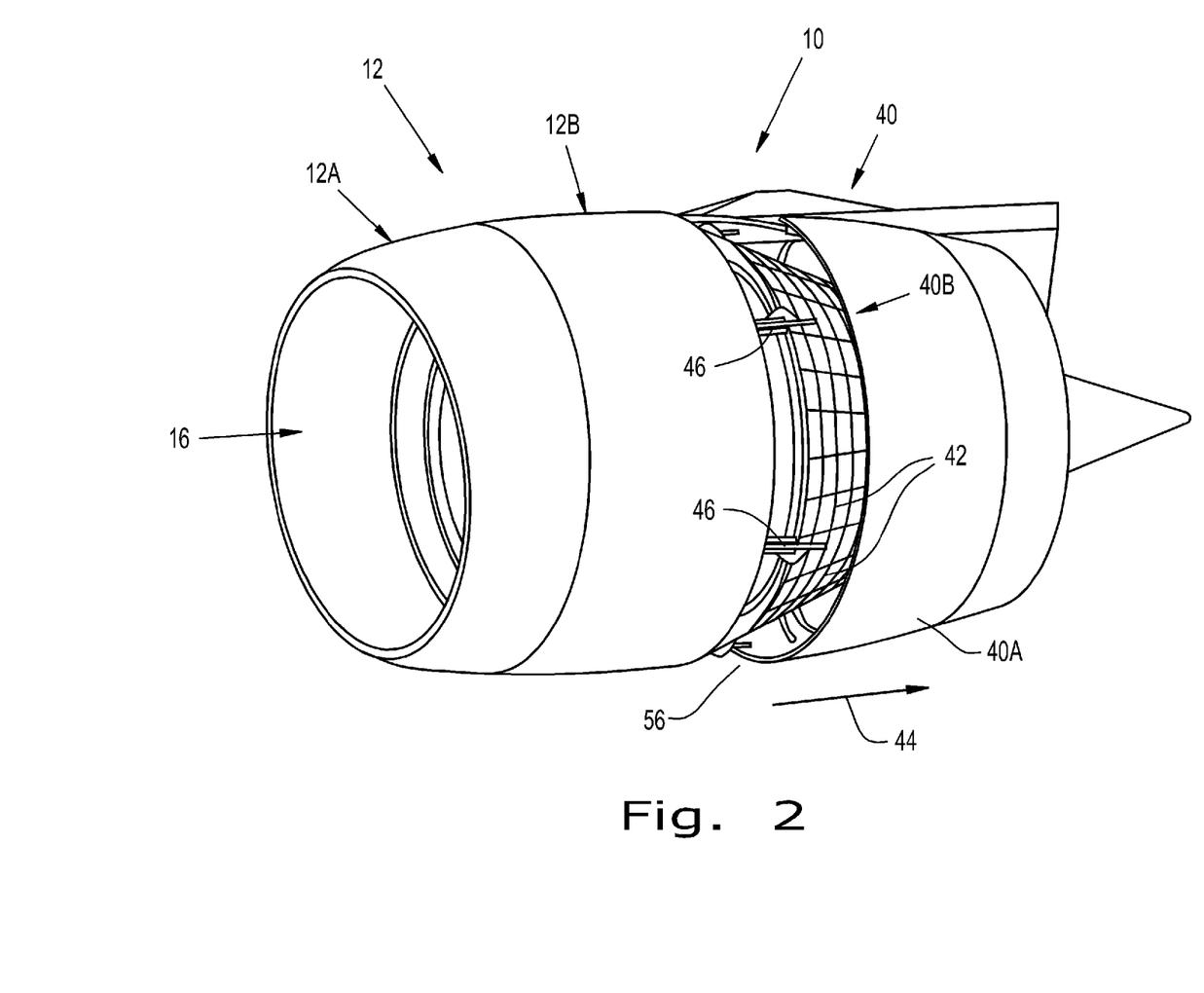
FIG. 2 schematically represents a perspective view of a high-bypass turbofan engine incorporating a thrust reverser system of a type within the scope of the present invention.
Figure 3:
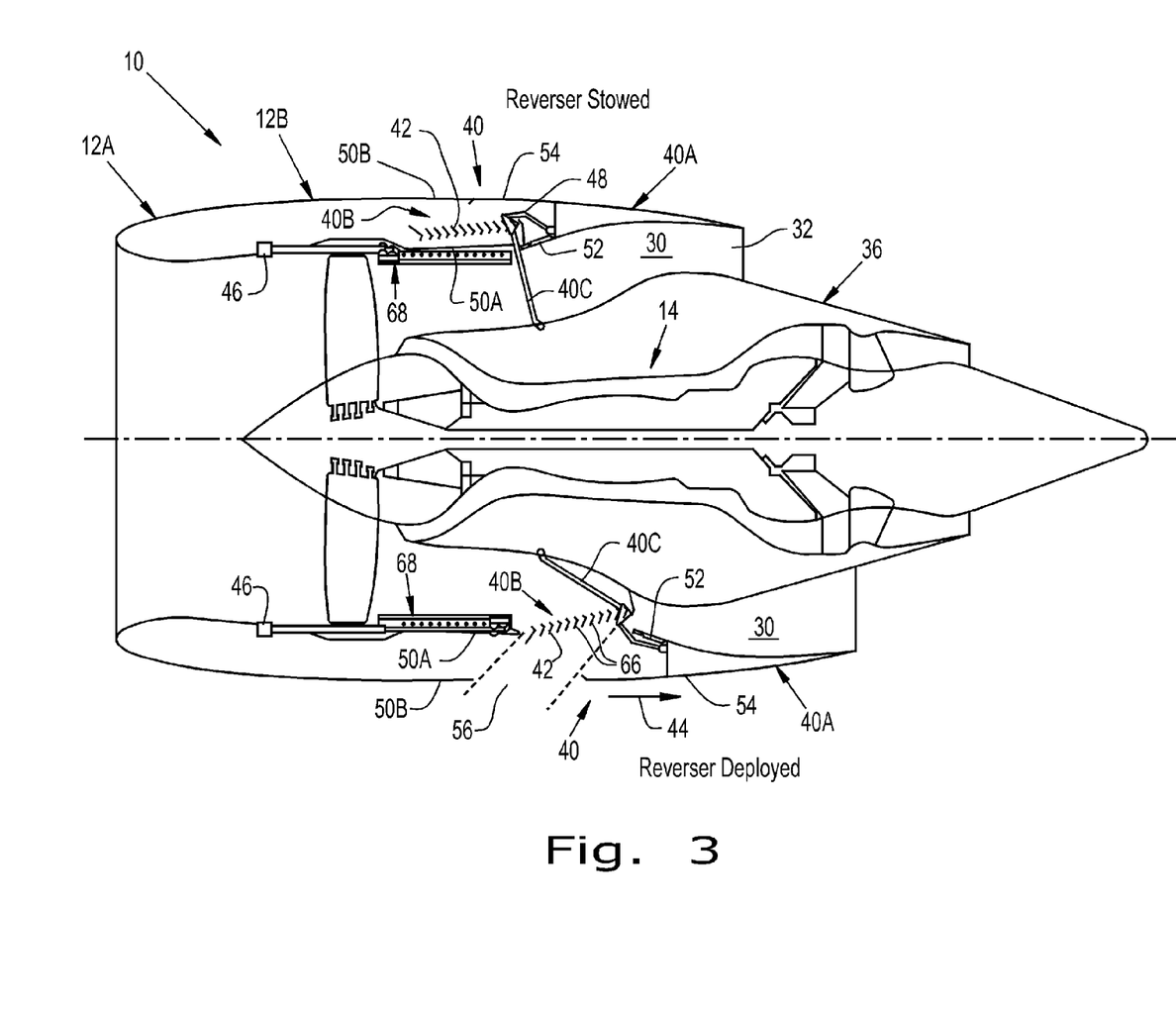
FIG. 3 is an axial (side) sectional view representing the turbofan engine of FIG. 2, and shows the thrust reverser system in stowed and fully deployed positions in the upper and lower halves of the view, respectively.
Figure 4:
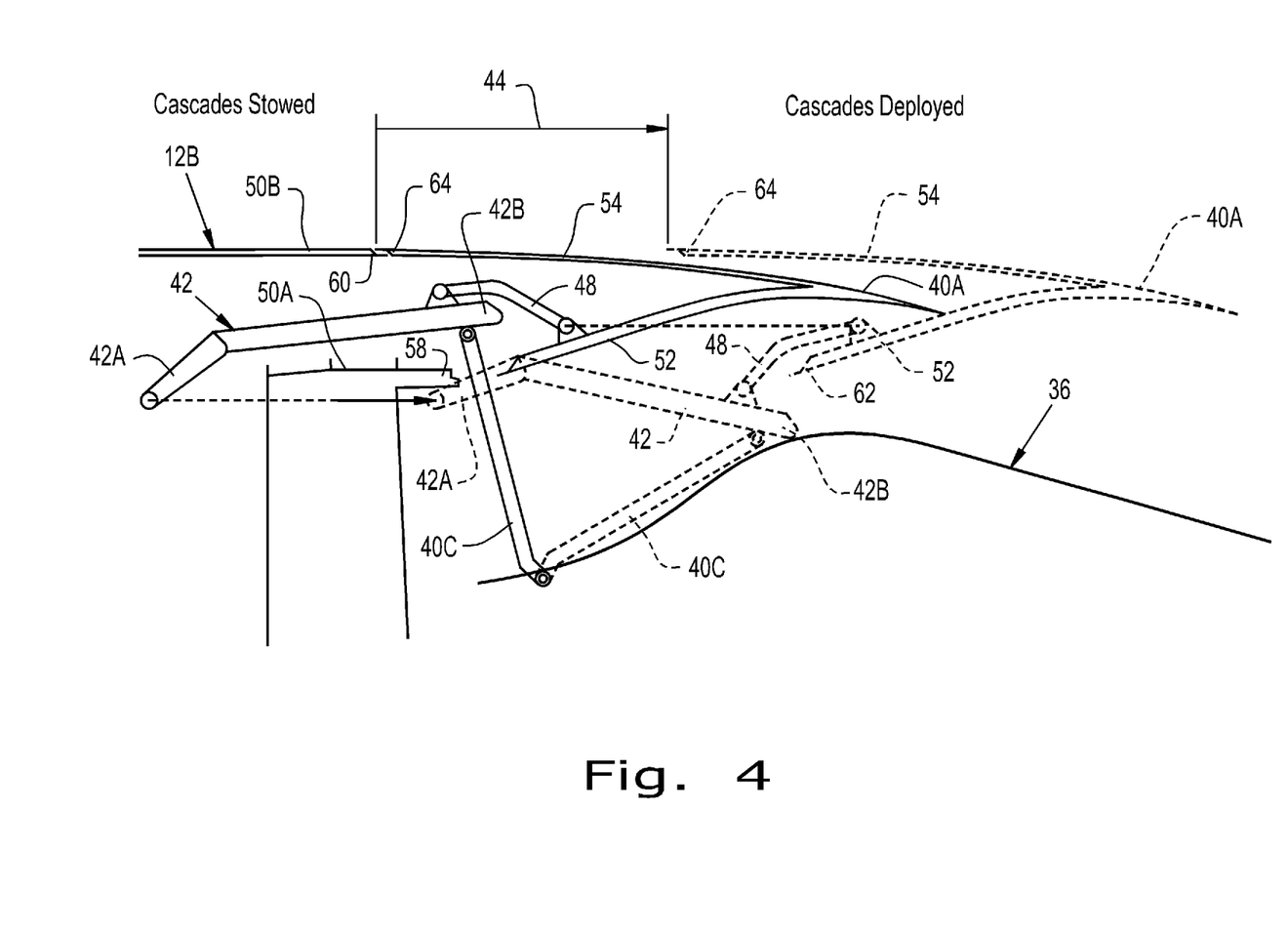
FIG. 4 is a detailed axial sectional view of a section of the thrust reverser system in the upper half of FIG. 3, and shows each of the stowed and fully deployed positions of the system.
Figure 5:
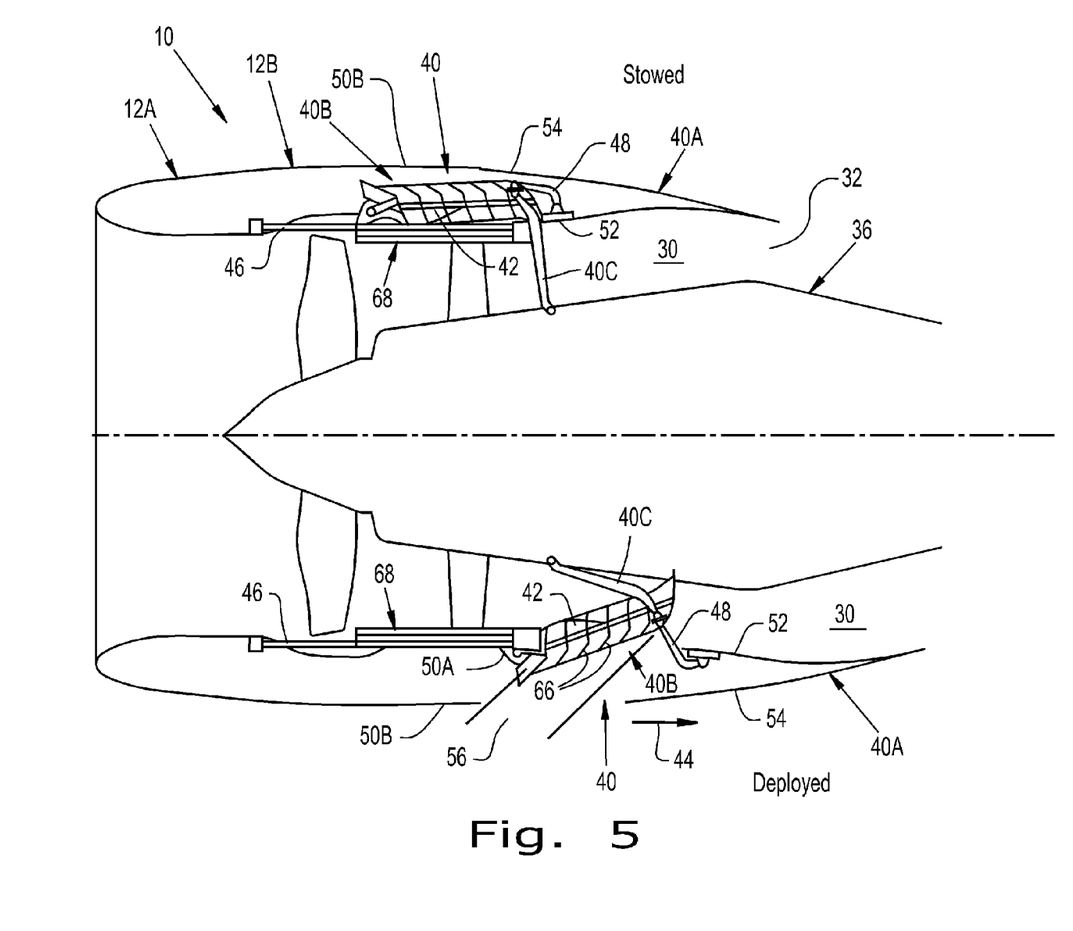
FIG. 5 is an axial (side) sectional view representing a turbofan engine and shows the reverser system in stowed and fully deployed positions in the upper and lower halves of the view, respectively.

The engine 10 represented in FIG. 2 generally encompasses two engines 10 depicted in FIGS. 3 through 5. The engine depicted in FIGS. 3 and 4 differs from the engine depicted in FIG. 5 at least in part on the basis of the configurations of their respective bypass ducts 30, and in particular the contour defined by their respective core cowls 36 in the vicinity of the thrust reverser system 40. More particularly, the contour of the region of the core cowl 36 immediately surrounded by the transcowl 40A in FIG. 5 has a more gradually and uniformly increasing diameter than the same region of the core cowl 36 shown in FIGS. 3 and 4. Accordingly, while the construction and operation of the thrust reverser system 40 are largely similar in both engines represented in FIGS. 3 and 5, certain distinctions will be discussed below where appropriate.

The thrust reverser system 40 of FIGS. 2 through 5 comprises a translating cowl (transcowl) 40A mounted to the nacelle 12, and a cascade system 40B within the nacelle 12. As evident from FIG. 2, the transcowl 40A is the aft-most section of the nacelle 12 located aft of the fan cowl 12B and circumscribes the core cowl 36. When deployed, the cascade system 40B is also located aft of the fan cowl 12B and circumscribes the core cowl 36. The cascade system 40B is preferably made up of a plurality of individual cascade segments 42 that are circumferentially spaced around the circumference of the nacelle 12. Notably absent from the views of the engines 10 shown in FIGS. 3 through 5 are blocker doors corresponding to the blocker doors 34C of FIG. 1. As evident from FIGS. 3 through 5, the segments 42 of the cascade system 40B are adapted to deploy from a stowed position, shown in the upper half of each of FIGS. 3 and 5 and shown in the detailed view of FIG. 4, to a fully deployed position shown in the lower half of each of FIGS. 3 and 5 and shown in phantom in FIG. 4. Whereas the cascade 34B of the prior art thrust reverser system 12C of FIG. 1 is an element of the fixed structure of the nacelle 12, meaning that the cascade 34B does not move during the operation of the thrust reverser system 12C, the transcowl 40A and cascade system 40B are adapted to be translated in unison in the aft direction 44 of the engine 10 to deploy the cascade system 40B into the bypass duct 30, causing bypassed air within the duct 30 to be diverted through the deployed cascade system 40B to provide a thrust reversal effect. For this purpose, FIGS. 2 through 5 represent the cascade segments 42 as pivotally coupled to the nacelle 12 through actuators 46 mounted to the nacelle 12. In addition, FIGS. 3 through 5 represent the cascade segments 42 as pivotally coupled to the core cowl 36 with drag links 40C, and represent the transcowl 40A as pivotally coupled to the cascade segments 42 through links 48 for translation therewith.

Translation of the cascade system 40B and transcowl 40A in the aft direction 44 causes the cascade segments 42 to be deployed into the bypass duct 30 in a manner represented in FIGS. 3 through 5. From these figures it can be appreciated that, when fully stowed, the cascade segments 42 are enclosed and completely concealed between inner and outer engine fan cases 50A and 50B and inner and outer walls 52 and 54 of the transcowl 40A, such that the inner engine fan case 50A and the inner wall 52 of the transcowl 40A define a portion of the radially outer flow surface of the bypass duct 30 and completely separate the cascade system 40B from the duct 30. An advantage of this configuration is that, in contrast to the reverser system 12C of FIG. 1, the reverser system 40 of this invention does not have blocker doors 34C that define any portion of the radially outer flow surface of the bypass duct 30 during normal engine operation. Consequently, the reverser system 40 can be configured to avoid surface interruptions (gaps and steps) and duct leakage that would increase aerodynamic drag and reduce aerodynamic performance of the engine 10. Another advantage is that the entire inner wall 52 of the transcowl 40A can incorporate an uninterrupted acoustic treatment (not shown) of its entire surface area to promote increased engine noise attenuation.

Movement of the cascade system 40B preferably includes at least two distinct phases during deployment of the thrust reverser system 40. During an initial phase, each cascade segment 42 translates aftward with the transcowl 40A relative to the fan cowl 12B, with minimal rotational movement between the segments 42 and fan cowl 12B. During a subsequent phase, with further aftward movement of its fore end 42A coupled to its actuator 46, each cascade segment 42 pivots about its fore end 42A as a result of the drag link 40C restricting aftward movement of the aft end 42B of the segment 42, causing the aft end 42B to move radially inward toward the core cowl 36 until each segment 42 assumes its fully deployed position and extends across the radial width of the duct 30. The segment 42 may but is not required to extend entirely across the radial width of the duct 30 so that its aft end 42B nearly contacts the core cowl 36. As represented in FIGS. 3 and 5, as bypassed air within the duct 30 encounters the cascade system 40B, the air is diverted by grid openings in the segments 42 and expelled through a circumferential opening 56 defined between the aft ends 58 and 60 of the inner and outer engine fan cases 50A and 50B and the fore ends 62 and 64 of the inner and outer walls 52 and 54 of the transcowl 40A. As depicted in FIG. 3, the aft end 42B of each segment 42 can be equipped with an extension that promotes the capture of air flowing along the outer surface of the core cowl 36. However, from FIGS. 3 through 5 it should also be evident that, other than their connections to the transcowl 40A through their links 48, the cascade segments 42 do not directly contact the transcowl 40A when fully deployed. As a result, a gap exists between each cascade segment 42 and each of the fore ends 62 and 64 of the inner and outer walls 52 and 54 of the transcowl 40A.

Figure 6:
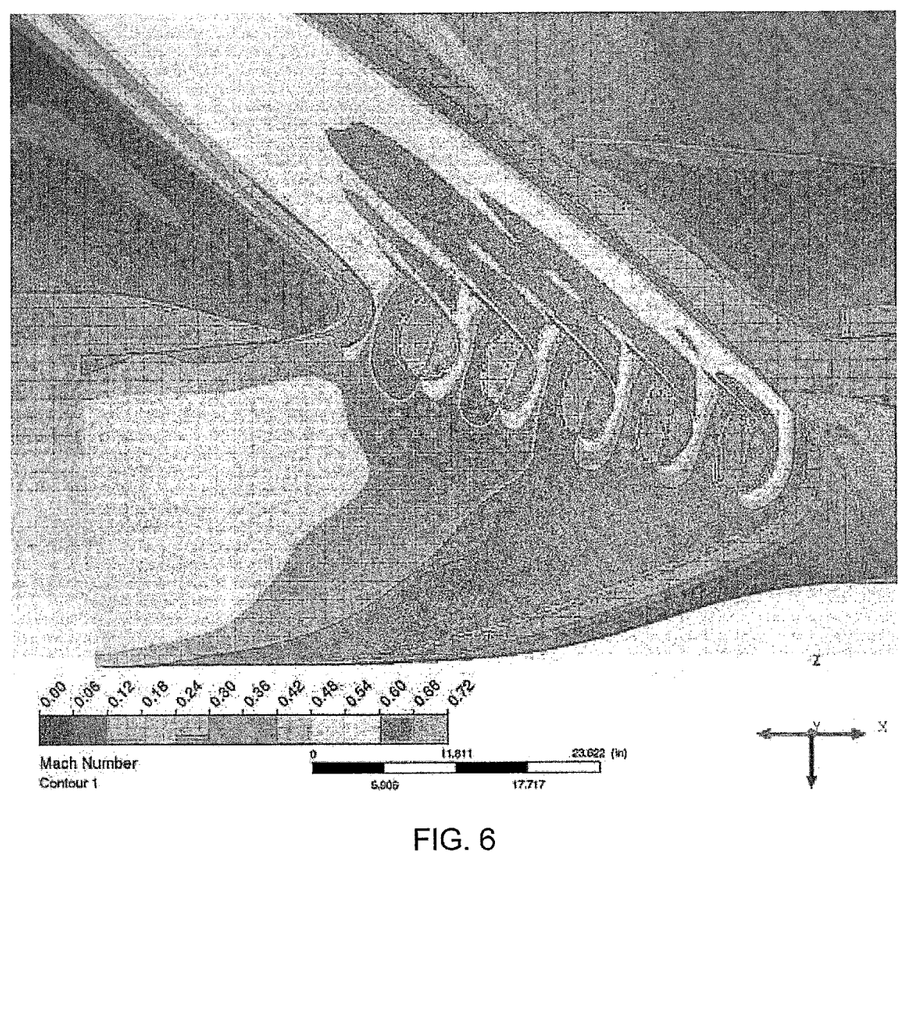
FIG. 6 is an image acquired from a Computation Fluid Dynamics (CFD) model representing the performance results predicted for a thrust reverser system of the type represented in FIGS. 3 through 5.

As evident from the above, the present invention incorporates to some extent the conventional role of a blocker door function into the cascade system 40B, and does so by adding rotation to the traditional translating motion of prior art cascades. To serve in this role, each cascade segment 42 must have a sufficient length and be sufficiently angled downward to, in preferred embodiments, completely block the fan bypass duct 30. For this reason, it is likely that the segments 42 may be longer than conventional fixed cascades that would be typically employed in the same engine. This aft down angle is favorable for cascade performance by replacing the traditional impulse-type cascade operation with a high reaction design, in which the grid elements 66 (FIGS. 3 and 5) have a sufficiently arcuate shape to deflect air flow away from the aforementioned gap between each cascade segment 42 and the fore ends 62 and 64 of the inner and outer walls 52 and 54 of the transcowl 40A. The efficacy of a cascade configured as represented in FIGS. 2 through 5 has been evaluated through the use of computational fluid dynamics (CFD) models. FIG. 6 contains an image from this analysis and evidences the capability of the cascade system 40B to turn nearly the entire aftward air flow within a duct by an angle of greater than 90 degrees, roughly about 135 degrees, with little if any backflow.

Figure 7:
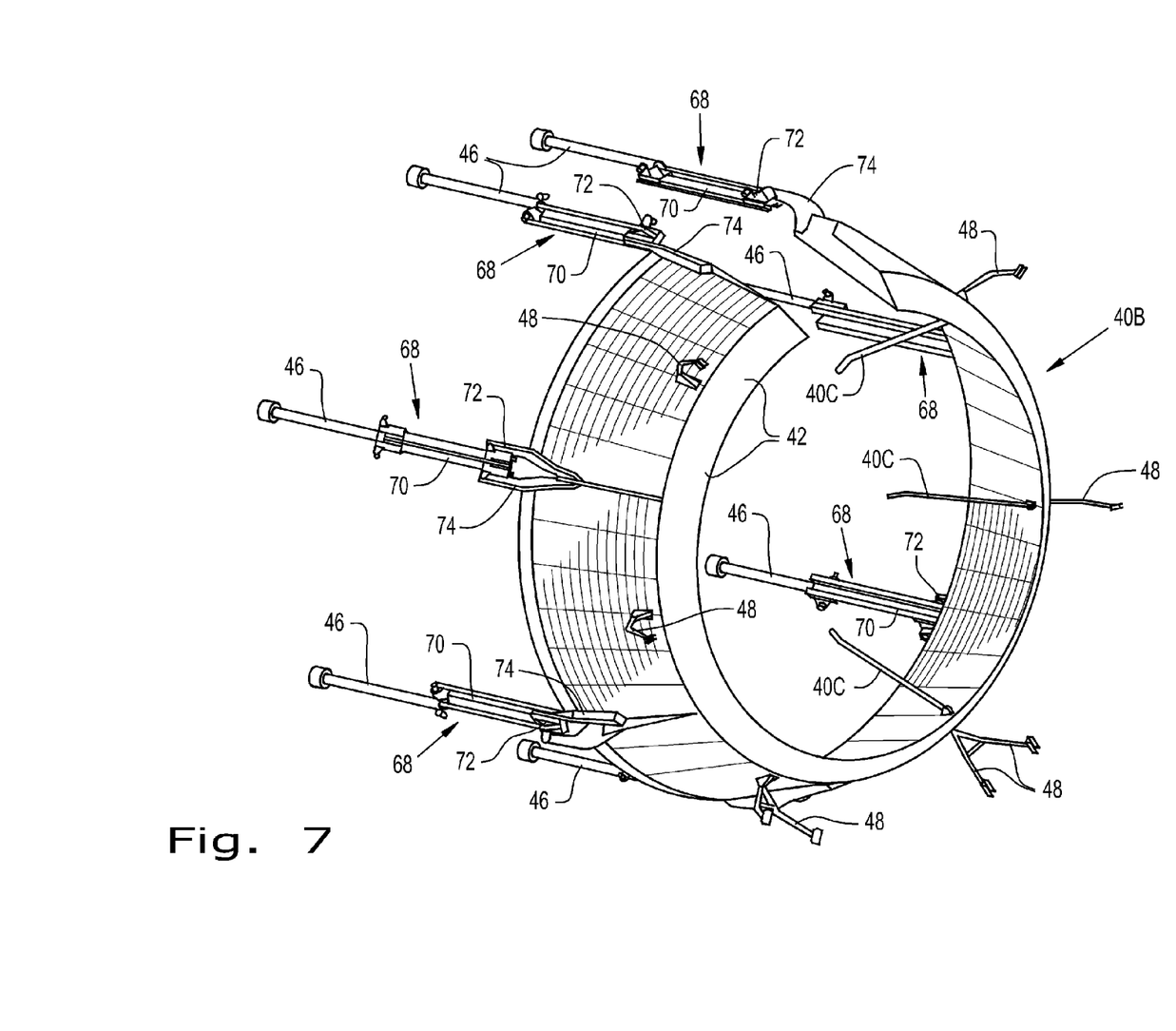
FIG. 7 is an isolated perspective view of the thrust reverser system of FIGS. 2 through 5, including an actuation system therefor.
Figure 8:
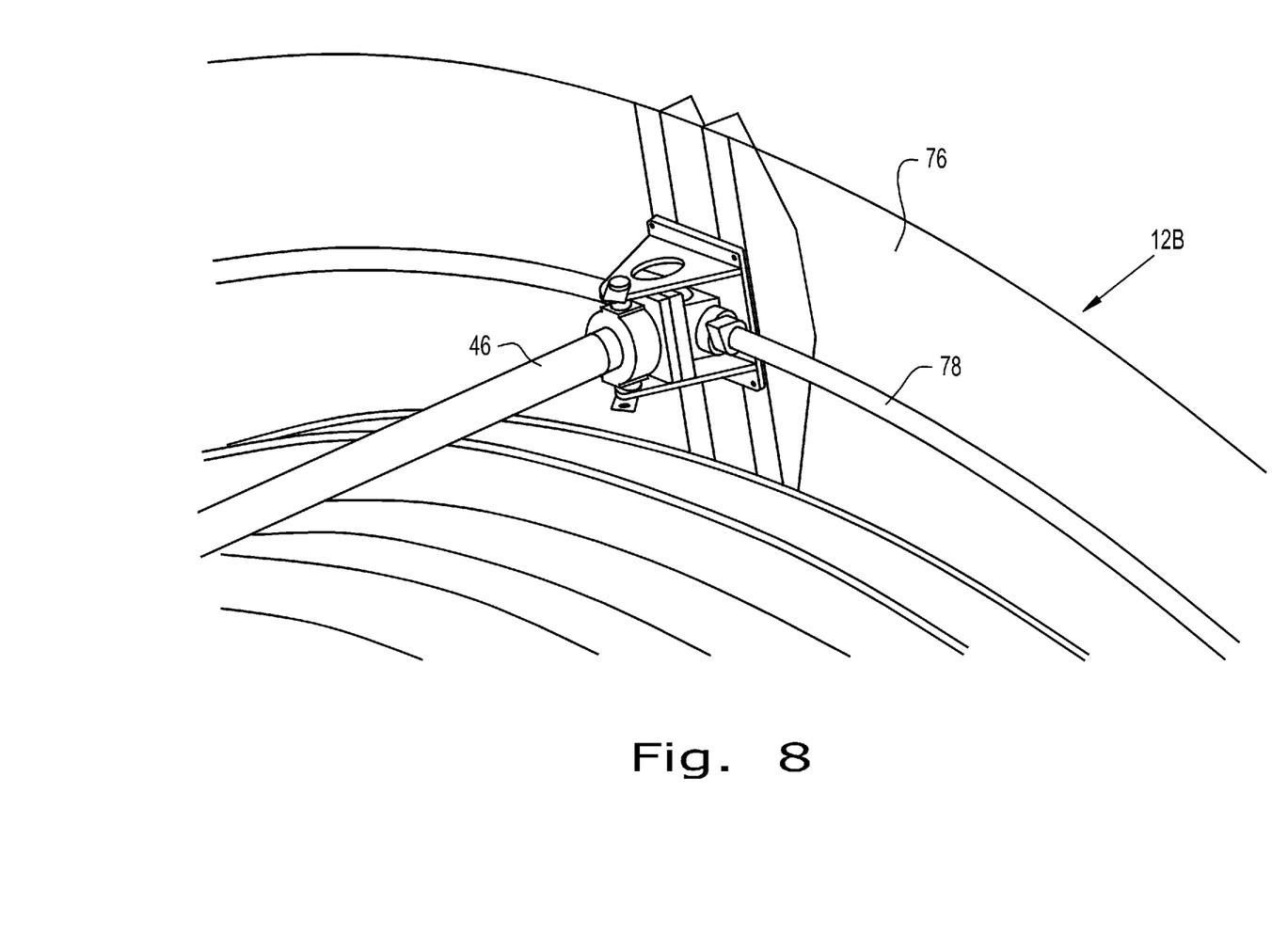
FIG. 8 is an isolated perspective view showing suitable drive and mounting arrangements for the actuation system of FIG. 7.

The cascade segments 42 are shown in FIGS. 3 and 5 as coupled to the fixed structure of the nacelle 12 with guided connection 68. FIG. 7 represents an isolated view of components of the thrust reverser system 40, including the actuators 46 and guided connections 68. The actuators 46 can be of any suitable type and can be driven by pneumatic, hydraulic, or electric motors. In the illustrated example, each guided connection 68 comprises a track 70 fixed to the engine fan case 50A and a trolley 72 attached via a bracket 74 to a cascade segment 42. The trolley 72 is configured for translational movement along its track 70 that results in fore and aft movement of its cascade segment 42 relative to the fan cowl 12B. The aft end of each actuator 46 is coupled to one of the trolleys 72, while the opposite fore end of each actuator 46 is coupled to the nacelle 12, for example, a bulkhead 76 within the fan cowl 12B as represented in FIG. 8. The connection between the trolley 72 and bracket 74 is shown as a rotating connection to accommodate the rotation of the cascade segment 42 associated therewith. Notably, the guide connection 68 does not define an arcuate path, such that the motion of the fore end 42A of the segment 42 is substantially entirely linear, consistent with the previous description of the sequential translational-rotational movement of the segments 42. As evident from FIG. 8, the fore end of each actuator 46 can be driven by a synchronizing cable 78, consistent with existing actuators employed to operate actuators employed in prior art thrust reverser systems.

Figure 9:
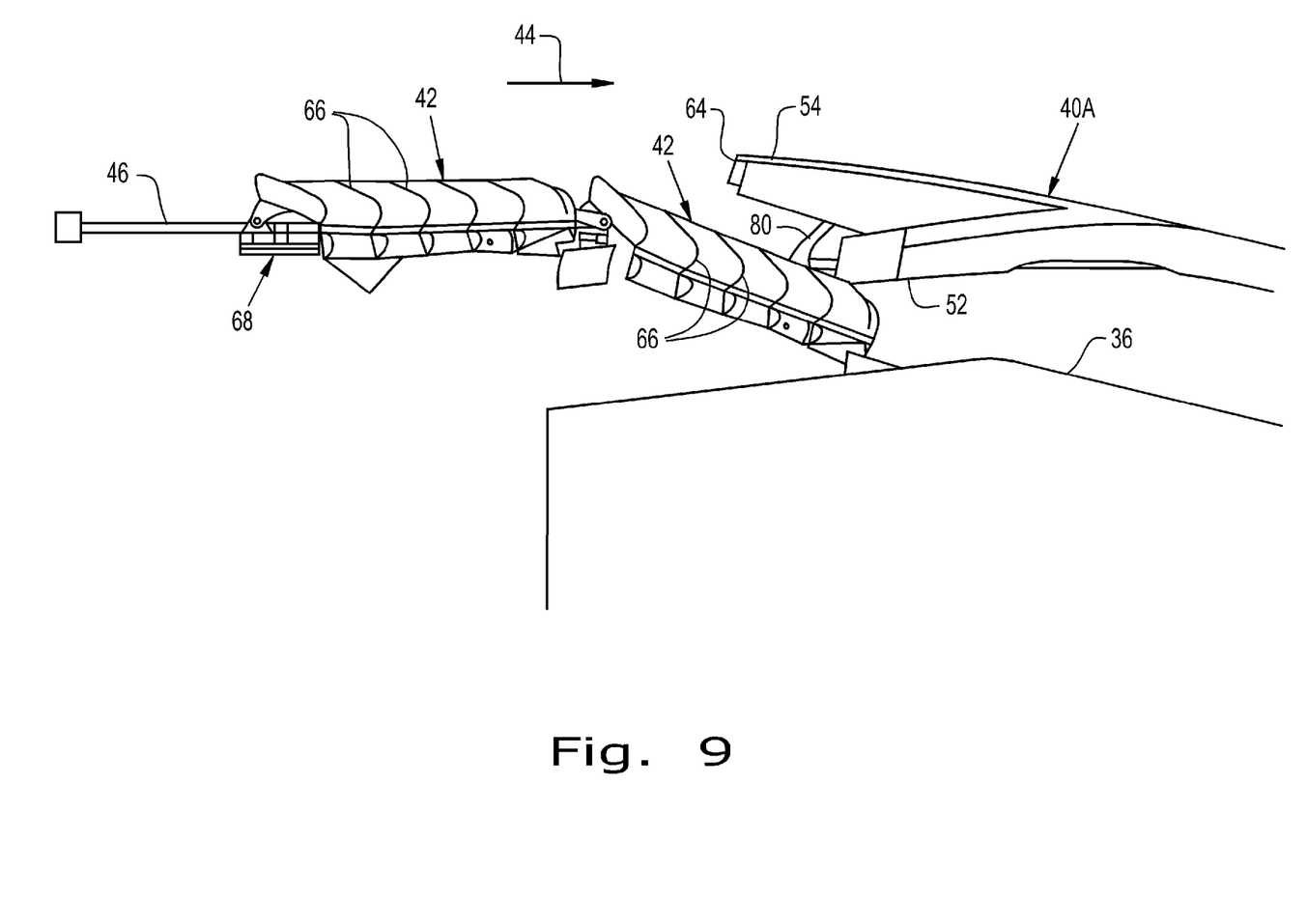
FIG. 9 is a detailed axial sectional view that schematically represents a stowed position and a fully deployed position of a section of a thrust reverser system in accordance with a second embodiment of the invention.
Figure 10:
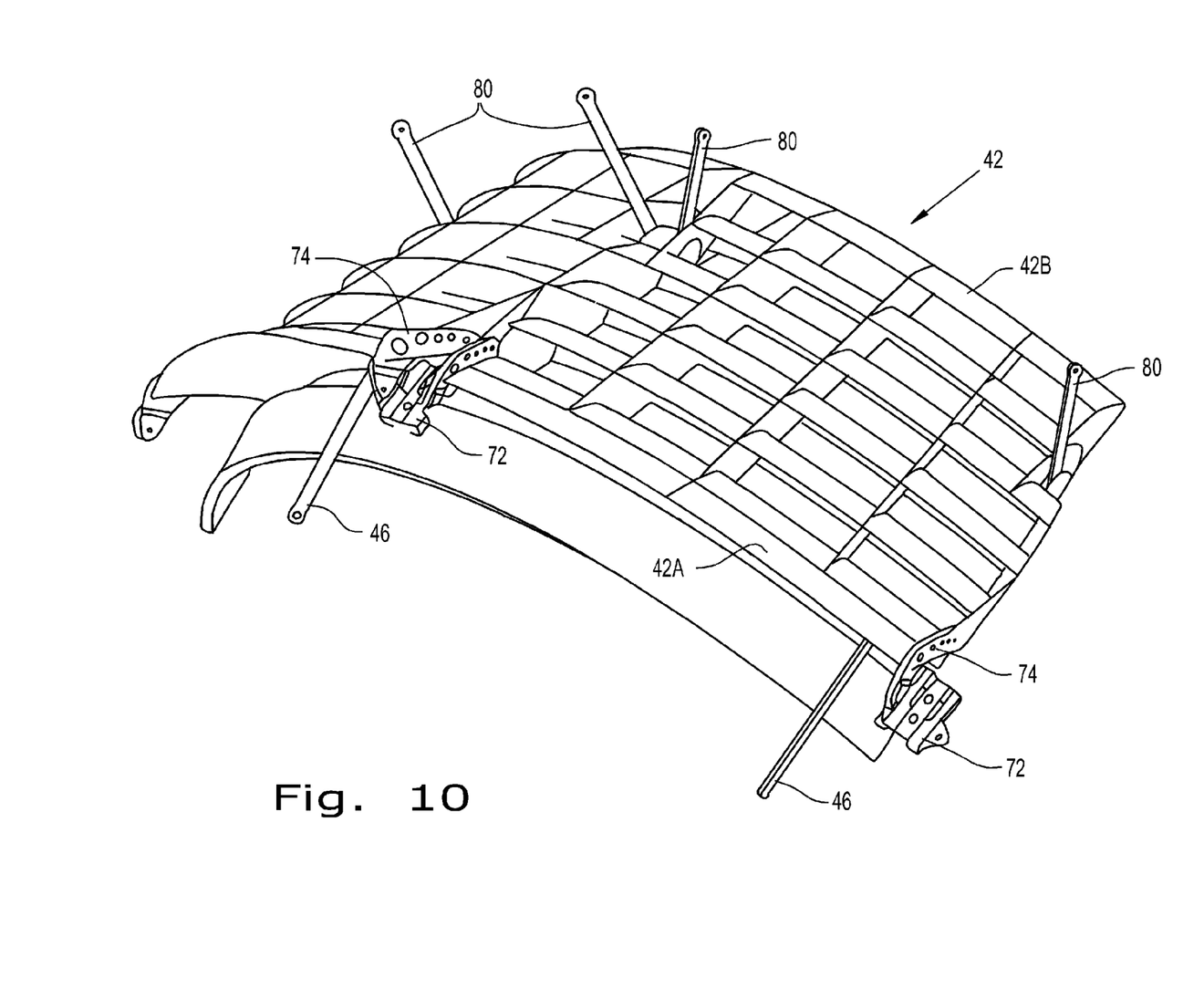
FIG. 10 is an isolated perspective view of a cascade of the thrust reverser system of FIG. 9.
Figure 11:
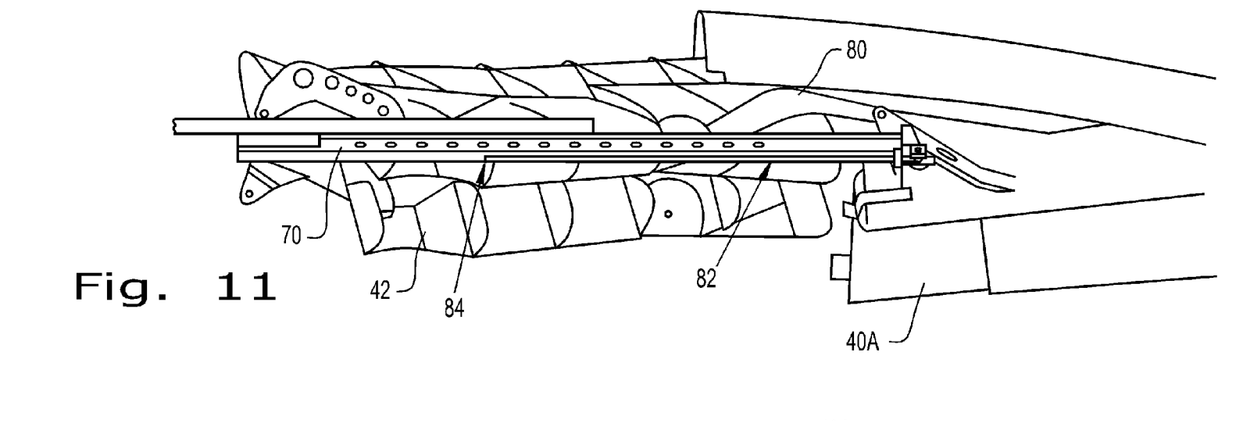
FIGS. 11 and 12 are additional detailed axial sectional views that schematically represent the operation of a stop mechanism for the cascade of FIG. 9.
Figure 12:
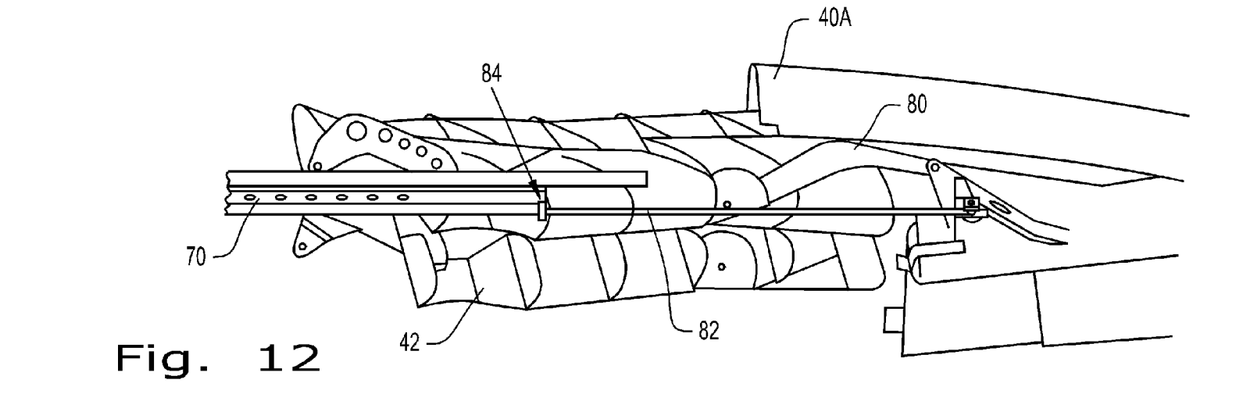

While the embodiment of FIGS. 2 through 5 depict each cascade segment 42 as equipped with two different links 40C and 48 rotatably coupled near the aft end 42B of each segment 42 to impart and control the rotational movement of the segment 42 during deployment, it is within the scope of the invention to eliminate the link 40C in order to further decrease aerodynamic drag and other flow perturbations that can cause aerodynamic or acoustic inefficiencies. As a nonlimiting example, FIGS. 9 and 10 represent an embodiment in which the rotational motion of the segments 42 is controlled by rotating links 80 that connect the aft end 42B of each segment 42 to the transcowl 40A. As represented in FIGS. 9 and 10, the guide connection 68 can be similar or the very same as that described for the embodiment of FIGS. 2 through 5. In this embodiment, the segment 42 initially translates aftward from a stowed position (the left-hand image of the segment 42 in FIG. 9) similar to what was described for the embodiment of FIGS. 2 through 5. Aftward translational motion of the segment 42 continues until the transcowl 40A encounters a stop (not shown in FIG. 9), which causes the links 80 to impart rotational movement to the segment 42 essentially similar to the rotational motion described for the embodiment of FIGS. 2 through 5. A nonlimiting example of a suitable stop is represented in FIGS. 11 and 12, which show a stop rod 82 pivotably coupled to the transcowl 40A and slidably coupled to the track 70 of a cascade segment 42. Translation of the transcowl 40A continues until the rail 70 encounters the end 84 of the stop rod 82 as shown in FIG. 12, after which the links 80 impart the rotational movement to the segment 42. Rotation of the segment 42 continues until the segment 42 acquires its deployed, represented by the right-hand image of the segment 42 in FIG. 9.

From the above discussion and depictions in FIGS. 1 through 10, it should be appreciated that the translational-rotational motion of the cascade segments 42 are not dependent on any particular type of cascade design, aside from the requirement that the cascade system 40B is capable of turning the air flow within the bypass duct 30 without the assistance of blocker doors. Furthermore, whereas the cascade segments 42 represented in FIGS. 2 through 10 have rigid constructions that do not intentionally bend, flex or fold during deployment, cascade segments 42 having any of these capabilities are also within the scope of the invention. Finally, it should also be appreciated that the thrust reverser system 40 and its individual components can be constructed of various materials, including metallic, plastic and composite materials commonly used in aerospace applications and fabricated by machining, casting, molding, lamination, etc., and combinations thereof.

While the invention has been described in terms of a specific embodiment, it is apparent that other forms could be adopted by one skilled in the art. For example, the engine 10, the thrust reverser system 40, and their components could differ in appearance and construction from the embodiment shown in the figures, the functions of each component of the thrust reverser system 40 could be performed by components of different construction but capable of a similar (though not necessarily equivalent) function, and various materials could be used in the construction of these components. Therefore, the scope of the invention is to be limited only by the following claims.

The invention claimed is:

1. A thrust reverser system for a gas turbine engine having a core engine, a core cowl surrounding the core engine, a nacelle surrounding the core cowl and comprising a fan cowl, and a bypass duct defined by and between the nacelle and the core cowl, the thrust reverser system comprising:
   a translating cowl mounted to the nacelle and adapted to translate in an aft direction of the gas turbine engine away from the fan cowl to define a circumferential opening therebetween, the translating cowl having a radially inner wall that defines a radially outer flow surface of the bypass duct;
   a fixed structure within the nacelle that does not translate when the translating cowl is translated in the aft direction;
   a cascade system mounted to the nacelle and adapted to move between a stowed position and a deployed position, the cascade system having a fore end and an oppositely-disposed aft end, the cascade system translating in the aft direction of the gas turbine engine and away from the fan cowl as the cascade system moves from the stowed position to the deployed position thereof, the aft end of the cascade system projecting into the bypass duct and the cascade system being operable to divert bypass air within the bypass duct through the circumferential opening when the cascade system is in the deployed positions thereof, the fore end of the cascade system being adapted for translating the cascade system in the aft direction, the aft end of the cascade system being adapted for initially causing the aft end to translate in the aft direction as the fore end translates in the aft direction and then subsequently pivot about the fore end so that further translation of the cascade system in the aft direction causes the cascade system to move to the deployed position into the bypass duct.

2. The thrust reverser system according to claim 1, wherein the thrust reverser system does not include a discreet blocker door that blocks air flow within the bypass duct downstream of the cascade system.

3. The thrust reverser system according to claim 1, further comprising actuators adapted to translate the fore end of the cascade system in the aft direction.

4. The thrust reverser system according to claim 1, further comprising guide connections slidably connected to the fore end of the cascade system and adapted to axially guide the fore end as the cascade system translates in the aft direction with the translating cowl and thereafter as the aft end pivots about the fore end.

5. The thrust reverser system according to claim 4, wherein the guide connections comprise tracks that are entirely linear along lengths thereof and impart solely linear translational motions to the fore end of the cascade system.

6. The thrust reverser system according to claim 1, further comprising:
   a first link pivotably coupled adjacent the aft end of the cascade system and pivotably coupled to the core cowl; and
   a second link pivotably coupled adjacent the aft end of the cascade system and pivotally coupled to the translating cowl.

7. The thrust reverser system according to claim 1, further comprising a link pivotably coupled adjacent the aft end of the cascade system and pivotally coupled to the translating cowl, and the thrust reverser system lacks any link coupled to the core cowl.

8. The thrust reverser system according to claim 1, wherein the cascade system is adapted to turn air flow within the bypass duct by an angle of greater than 90 degrees.

9. The thrust reverser system according to claim 1, wherein the cascade system in the deployed position thereof contacts the core cowl and defines a gap with a fore end of the radially inner wall of the translating cowl.

10. A thrust reverser system for a gas turbine engine having a core engine, a core cowl surrounding the core engine, a nacelle surrounding the core cowl and comprising a fan cowl, and a bypass duct defined by and between the nacelle and the core cowl, the thrust reverser system comprising:
   a translating cowl mounted to the nacelle and adapted to translate in an aft direction of the gas turbine engine away from the fan cowl to define a circumferential opening therebetween, the translating cowl having a radially inner wall that defines a radially outer flow surface of the bypass duct;
   a fixed structure within the nacelle that does not translate when the translating cowl is translated in the aft direction;
   a cascade system comprising cascade segments mounted to the nacelle and adapted to move between a stowed position and a deployed position, each of the cascade segments having a fore end and an oppositely-disposed aft end, each of the cascade segments translating with the translating cowl in the aft direction of the gas turbine engine and away from the fan cowl as the cascade segment moves from the stowed position to the deployed position thereof, the inner wall of the translating cowl being between each of the cascade segments and the bypass duct when the cascade segments are in their stowed positions, the aft ends of the cascade segments projecting into the bypass duct and the cascade segments being operable to divert bypass air within the bypass duct through the circumferential opening when the cascade segments are in the deployed positions;
   first means pivotably coupled adjacent the fore end of each of the cascade segments for translating the cascade segment in the aft direction; and
   second means pivotably coupled adjacent the aft end of each of the cascade segments for initially causing the aft end to translate in the aft direction as the fore end translates in the aft direction and then subsequently causing the aft end to pivot about the fore end so that further translation of the cascade segment in the aft direction causes the cascade segment to move to the deployed position;

wherein the thrust reverser system does not include a discreet blocker door that blocks air flow within the bypass duct downstream of the cascade segments.

11. The thrust reverser system according to claim 10, wherein the first means comprises actuators adapted to translate the fore ends of the cascade segments in the aft direction.

12. The thrust reverser system according to claim 10, wherein the first means comprises guide connections slidably connected to the fore ends of the cascade segments and adapted to axially guide the fore ends as the cascade segments translate in the aft direction with the translating cowl and thereafter as the aft ends pivot about the fore ends.

13. The thrust reverser system according to claim 12, wherein the guide connections comprise tracks that are entirely linear along lengths thereof and impart solely linear translational motions to the fore ends of the cascade segments.

14. The thrust reverser system according to claim 10, wherein the second means comprises:
a first link pivotably coupled adjacent the aft end of each of the cascade segments and pivotably coupled to the core cowl; and
a second link pivotably coupled adjacent the aft end of each of the cascade segments and pivotally coupled to the translating cowl.

15. The thrust reverser system according to claim 10, wherein the second means comprises a link pivotably coupled adjacent the aft end of each of the cascade segments and pivotally coupled to the translating cowl, and the thrust reverser system lacks any link coupled to the core cowl.

16. The thrust reverser system according to claim 10, wherein each of the cascade segments is adapted to turn air flow within the bypass duct by an angle of greater than 90 degrees.

17. The thrust reverser system according to claim 10, wherein each of the cascade segments in the deployed position thereof contacts the core cowl and defines a gap with a fore end of the radially inner wall of the translating cowl.

18. A high-bypass gas turbofan engine comprising the thrust reverser system of claim 10.

19. A method of reversing thrust of a gas turbine engine having a core engine, a core cowl surrounding the core engine, a nacelle surrounding the core cowl and comprising a fan cowl and a translating cowl adapted to translate in an aft direction of the gas turbine engine away from the fan cowl to define a circumferential opening therebetween, and a bypass duct defined by and between the fan cowl and the core cowl, the method comprising:
stowing a cascade system in a stowed position so that an inner wall of the translating cowl is between the bypass duct and the cascade system;
translating the translating cowl and the cascade system in an aft direction of the gas turbine engine to expose the circumferential opening; and
deploying the cascade system from the stowed positions thereof to a deployed position thereof as the translating cowl and the cascade system are translated in the aft direction, the cascade system having a fore end and an oppositely-disposed aft end, the cascade system being deployed as a result of the fore end translating in the aft direction and the aft end initially translating in the aft direction as the fore end translates in the aft direction and then subsequently pivoting about the fore end so that further translation of the cascade system in the aft direction causes the cascade system to move to the deployed position into the bypass duct.

20. The method according to claim 19, wherein the thrust reverser system does not include a discreet blocker door that blocks air flow within the bypass duct downstream of the cascade segments.

21. The method according to claim 19, wherein the cascade system in the deployed position thereof contacts the core cowl.

22. The method according to claim 19, wherein the cascade system in the deployed position thereof defines a gap with a fore end of the radially inner wall of the translating cowl.

23. The method according to claim 19, wherein multiple links pivotally coupling the translating cowl to the cascade segments cause the translating cowl to translate with the cascade system during the translating step.

* * * * *